United States Patent [19]
Hwang et al.

[11] Patent Number: 5,875,125
[45] Date of Patent: Feb. 23, 1999

[54] X+2X ADDER WITH MULTI-BIT GENERATE/PROPAGATE CIRCUIT

[75] Inventors: Wei Hwang, Armonk; Xiaodong Xiao, Mohegan Lake, both of N.Y.

[73] Assignee: International Business Machines Corporation, Armonk, N.Y.

[21] Appl. No.: 888,254

[22] Filed: Jul. 7, 1997

[51] Int. Cl.$^6$ .................................................. G06F 7/50
[52] U.S. Cl. ................ 364/787.01; 364/788; 364/754.01
[58] Field of Search .............................. 364/787.01–788, 364/754, 760.01–760.03

[56] References Cited

U.S. PATENT DOCUMENTS

| | | | |
|---|---|---|---|
| 4,682,303 | 7/1987 | Uya | 364/788 |
| 5,426,599 | 6/1995 | Machida | 364/760.03 |

*Primary Examiner*—Tan V. Mai
*Attorney, Agent, or Firm*—Whitham, Curtis & Whitham; Robert P. Tassinari, Esq.

[57] ABSTRACT

The computation speed of a fast X+2X adder is improved by restructuring the carry generate/propagate logic. The adder is implemented with a multi-bit generation/propagation circuit which takes full advantage of the fact that in the X+2X computation, the input X is left-shifted by one bit and then added to itself. Significantly simplified multi-bit carry generate and propagate functions, and therefore fast circuits, are the result.

7 Claims, 16 Drawing Sheets

| $x_{i-4}$ | $x_{i-3}$ | $x_{i-2}$ | $x_{i-1}$ | $x_i$ | $g4_i$ | $p4_i$ |
|---|---|---|---|---|---|---|
| 0 | 0 | 0 | 0 | 0 | 0 | 0 |
| 0 | 0 | 0 | 0 | 1 | 0 | 0 |
| 0 | 0 | 0 | 1 | 0 | 0 | 0 |
| 0 | 0 | 0 | 1 | 1 | 1 | 1 |
| 0 | 0 | 1 | 0 | 0 | 0 | 0 |
| 0 | 0 | 1 | 0 | 1 | 0 | 0 |
| 0 | 0 | 1 | 1 | 0 | 1 | 1 |
| 0 | 0 | 1 | 1 | 1 | 1 | 1 |
| 0 | 1 | 0 | 0 | 0 | 0 | 0 |
| 0 | 1 | 0 | 0 | 1 | 0 | 0 |
| 0 | 1 | 0 | 1 | 0 | 0 | 1 |
| 0 | 1 | 0 | 1 | 1 | 1 | 1 |
| 0 | 1 | 1 | 0 | 0 | 0 | 0 |
| 0 | 1 | 1 | 0 | 1 | 1 | 1 |
| 0 | 1 | 1 | 1 | 0 | 1 | 1 |
| 0 | 1 | 1 | 1 | 1 | 1 | 1 |
| 1 | 0 | 0 | 0 | 0 | 0 | 0 |
| 1 | 0 | 0 | 0 | 1 | 0 | 0 |
| 1 | 0 | 0 | 1 | 0 | 0 | 0 |
| 1 | 0 | 0 | 1 | 1 | 1 | 1 |
| 1 | 0 | 1 | 0 | 0 | 0 | 0 |
| 1 | 0 | 1 | 0 | 1 | 0 | 1 |
| 1 | 0 | 1 | 1 | 0 | 1 | 1 |
| 1 | 0 | 1 | 1 | 1 | 1 | 1 |
| 1 | 1 | 0 | 0 | 0 | 0 | 0 |
| 1 | 1 | 0 | 0 | 1 | 0 | 0 |
| 1 | 1 | 0 | 1 | 0 | 1 | 1 |
| 1 | 1 | 0 | 1 | 1 | 1 | 1 |
| 1 | 1 | 1 | 0 | 0 | 0 | 0 |
| 1 | 1 | 1 | 0 | 1 | 1 | 1 |
| 1 | 1 | 1 | 1 | 0 | 1 | 1 |
| 1 | 1 | 1 | 1 | 1 | 1 | 1 |

FIG.3
PRIOR ART

| $x_{i-4}$ | $x_{i-3}$ | $x_{i-2}$ | $x_{i-1}$ | $x_i$ | $3Xg4_i$ | $3Xp4_i$ |
|---|---|---|---|---|---|---|
| 0 | 0 | 0 | 0 | 0 | 0 | 0 |
| 0 | 0 | 0 | 0 | 1 | 0 | 0 |
| 0 | 0 | 0 | 1 | 0 | 0 | 0 |
| 0 | 0 | 0 | 1 | 1 | 1 | 0 |
| 0 | 0 | 1 | 0 | 0 | 0 | 0 |
| 0 | 0 | 1 | 0 | 1 | 0 | 0 |
| 0 | 0 | 1 | 1 | 0 | 1 | 0 |
| 0 | 0 | 1 | 1 | 1 | 1 | 0 |
| 0 | 1 | 0 | 0 | 0 | 0 | 0 |
| 0 | 1 | 0 | 0 | 1 | 0 | 0 |
| 0 | 1 | 0 | 1 | 0 | 0 | 1 |
| 0 | 1 | 0 | 1 | 1 | 1 | 1 |
| 0 | 1 | 1 | 0 | 0 | 0 | 0 |
| 0 | 1 | 1 | 0 | 1 | 1 | 0 |
| 0 | 1 | 1 | 1 | 0 | 1 | 1 |
| 0 | 1 | 1 | 1 | 1 | 1 | 1 |
| 1 | 0 | 0 | 0 | 0 | 0 | 0 |
| 1 | 0 | 0 | 0 | 1 | 0 | 0 |
| 1 | 0 | 0 | 1 | 0 | 0 | 0 |
| 1 | 0 | 0 | 1 | 1 | 1 | 0 |
| 1 | 0 | 1 | 0 | 0 | 0 | 0 |
| 1 | 0 | 1 | 0 | 1 | 0 | 1 |
| 1 | 0 | 1 | 1 | 0 | 1 | 0 |
| 1 | 0 | 1 | 1 | 1 | 1 | 1 |
| 1 | 1 | 0 | 0 | 0 | 0 | 0 |
| 1 | 1 | 0 | 0 | 1 | 0 | 0 |
| 1 | 1 | 0 | 1 | 0 | 1 | 1 |
| 1 | 1 | 0 | 1 | 1 | 1 | 1 |
| 1 | 1 | 1 | 0 | 0 | 0 | 0 |
| 1 | 1 | 1 | 0 | 1 | 1 | 1 |
| 1 | 1 | 1 | 1 | 0 | 1 | 1 |
| 1 | 1 | 1 | 1 | 1 | 1 | 1 |

| $x_{i-4}$ | $x_{i-3}$ | $x_{i-2}$ | $x_{i-1}$ | $x_i$ | $3Xg4_i$ | $3Xp4_i$ |
|---|---|---|---|---|---|---|
| 0 | 0 | 0 | 0 | 0 | 0 | 0 |
| 0 | 0 | 0 | 0 | 1 | 0 | 0 |
| 0 | 0 | 0 | 1 | 0 | 0 | 0 |
| 0 | 0 | 0 | 1 | 1 | 1 | 0 |
| 0 | 0 | 1 | 0 | 0 | 0 | 0 |
| 0 | 0 | 1 | 0 | 1 | 0 | 0 |
| 0 | 0 | 1 | 1 | 0 | 1 | 0 |
| 0 | 0 | 1 | 1 | 1 | 1 | 0 |
| 0 | 1 | 0 | 0 | 0 | 0 | 0 |
| 0 | 1 | 0 | 0 | 1 | 0 | 0 |
| 0 | 1 | 0 | 1 | 0 | 0 | 1 |
| 0 | 1 | 0 | 1 | 1 | 1 | 1 |
| 0 | 1 | 1 | 0 | 0 | 0 | 0 |
| 0 | 1 | 1 | 0 | 1 | 1 | 1 |
| 0 | 1 | 1 | 1 | 0 | 1 | 1 |
| 0 | 1 | 1 | 1 | 1 | 1 | 1 |
| 1 | 0 | 0 | 0 | 0 | 0 | 0 |
| 1 | 0 | 0 | 0 | 1 | 0 | 0 |
| 1 | 0 | 0 | 1 | 0 | 0 | 0 |
| 1 | 0 | 0 | 1 | 1 | 1 | 1 |
| 1 | 0 | 1 | 0 | 0 | 0 | 0 |
| 1 | 0 | 1 | 0 | 1 | 0 | 1 |
| 1 | 0 | 1 | 1 | 0 | 1 | 1 |
| 1 | 0 | 1 | 1 | 1 | 1 | 1 |
| 1 | 1 | 0 | 0 | 0 | 0 | 0 |
| 1 | 1 | 0 | 0 | 1 | 0 | 0 |
| 1 | 1 | 0 | 1 | 0 | 1 | 1 |
| 1 | 1 | 0 | 1 | 1 | 1 | 1 |
| 1 | 1 | 1 | 0 | 0 | 0 | 0 |
| 1 | 1 | 1 | 0 | 1 | 1 | 1 |
| 1 | 1 | 1 | 1 | 0 | 1 | 1 |
| 1 | 1 | 1 | 1 | 1 | 1 | 1 |

| $X_{i-3}$ | $X_{i-2}$ | $X_{i-1}$ | $X_i$ | $3Xg3_i$ | $3Xp3_i$ |
|---|---|---|---|---|---|
| 0 | 0 | 0 | 0 | 0 | 0 |
| 0 | 0 | 0 | 1 | 0 | 0 |
| 0 | 0 | 1 | 0 | 0 | 0 |
| 0 | 0 | 1 | 1 | 1 | 0 |
| 0 | 1 | 0 | 0 | 0 | 0 |
| 0 | 1 | 0 | 1 | 0 | 1 |
| 0 | 1 | 1 | 0 | 1 | 0 |
| 0 | 1 | 1 | 1 | 1 | 1 |
| 1 | 0 | 0 | 0 | 0 | 0 |
| 1 | 0 | 0 | 1 | 0 | 0 |
| 1 | 0 | 1 | 0 | 0 | 1 |
| 1 | 0 | 1 | 1 | 1 | 1 |
| 1 | 1 | 0 | 0 | 0 | 0 |
| 1 | 1 | 0 | 1 | 1 | 1 |
| 1 | 1 | 1 | 0 | 1 | 1 |
| 1 | 1 | 1 | 1 | 1 | 1 |

| $X_{i-3}$ | $X_{i-2}$ | $X_{i-1}$ | $X_i$ | $3Xg3_i$ | $3Xp3_i$ |
|---|---|---|---|---|---|
| 0 | 0 | 0 | 0 | 0 | 0 |
| 0 | 0 | 0 | 1 | 0 | 0 |
| 0 | 0 | 1 | 0 | 0 | 0 |
| 0 | 0 | 1 | 1 | 1 | 0 |
| 0 | 1 | 0 | 0 | 0 | 0 |
| 0 | 1 | 0 | 1 | 0 | 1 |
| 0 | 1 | 1 | 0 | 1 | 1 |
| 0 | 1 | 1 | 1 | 1 | 1 |
| 1 | 0 | 0 | 0 | 0 | 0 |
| 1 | 0 | 0 | 1 | 0 | 0 |
| 1 | 0 | 1 | 0 | 0 | 1 |
| 1 | 0 | 1 | 1 | 1 | 1 |
| 1 | 1 | 0 | 0 | 0 | 0 |
| 1 | 1 | 0 | 1 | 1 | 1 |
| 1 | 1 | 1 | 0 | 1 | 1 |
| 1 | 1 | 1 | 1 | 1 | 1 |

FIG.14

X+2X ADDER WITH MULTI-BIT GENERATE/ PROPAGATE CIRCUIT

BACKGROUND OF THE INVENTION

1. Field of the Invention

The present invention generally relates to digital data processing circuits, and more particularly to a binary X+2X adder using a multi-bit generate/propagate circuit.

2. Background Description

Binary multipliers are generally used in microprocessors, digital signal processors, micro controllers, and other digital integrated circuit (IC) products. For multipliers which use a multi-bit Booth algorithm, dedicated 3X computation circuits are needed for partial product generation, and the 3X partial product generator is almost always on the critical timing path. Conceptually, multiplying an input X by 3 can be accomplished by adding the input X and its 1-bit left-shifted value 2X using an adder as illustrated in the table of FIG. 1.

Figure 1:
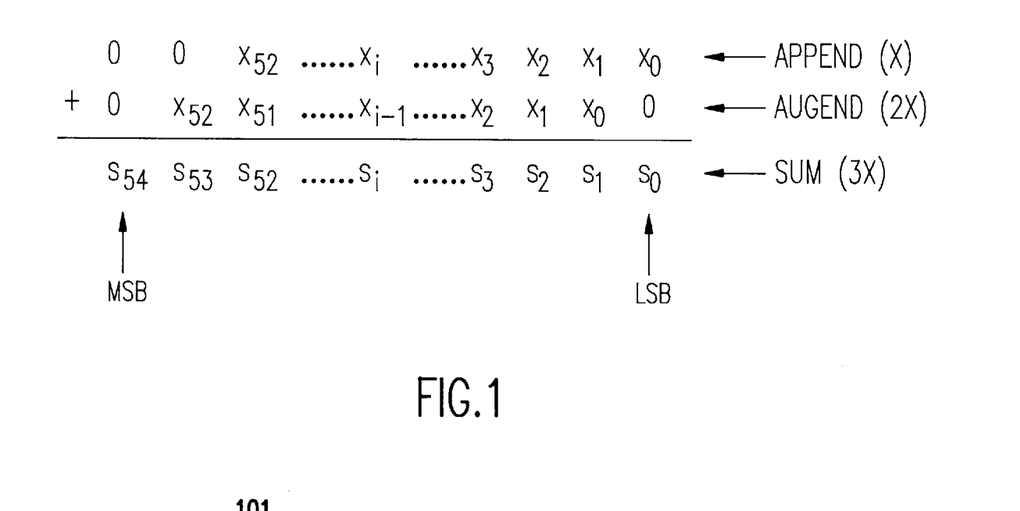
FIG. 1 is table illustrating the computation of 3X by adding the binary number X and its 1-bit-left-shifted version.

In FIG. 1, the addend (X) represents a multi-bit $00x_{52}...x_i...x_3x_2x_1x_0$ binary number X, where $x_0$ is the least-significant-bit. The augend (2x) represents a 1-bit left-shifted version of addend, which has a binary value of 2X. As in any type of adder design, the speed of the adder is often limited by the time it takes to perform carry generation and propagation logic delay. Therefore, any simplification of the carry generation and propagation logic for X+2X adder would directly improve the speed of 3X computation, and hence the speed of any given multiplier.

Figure 2:
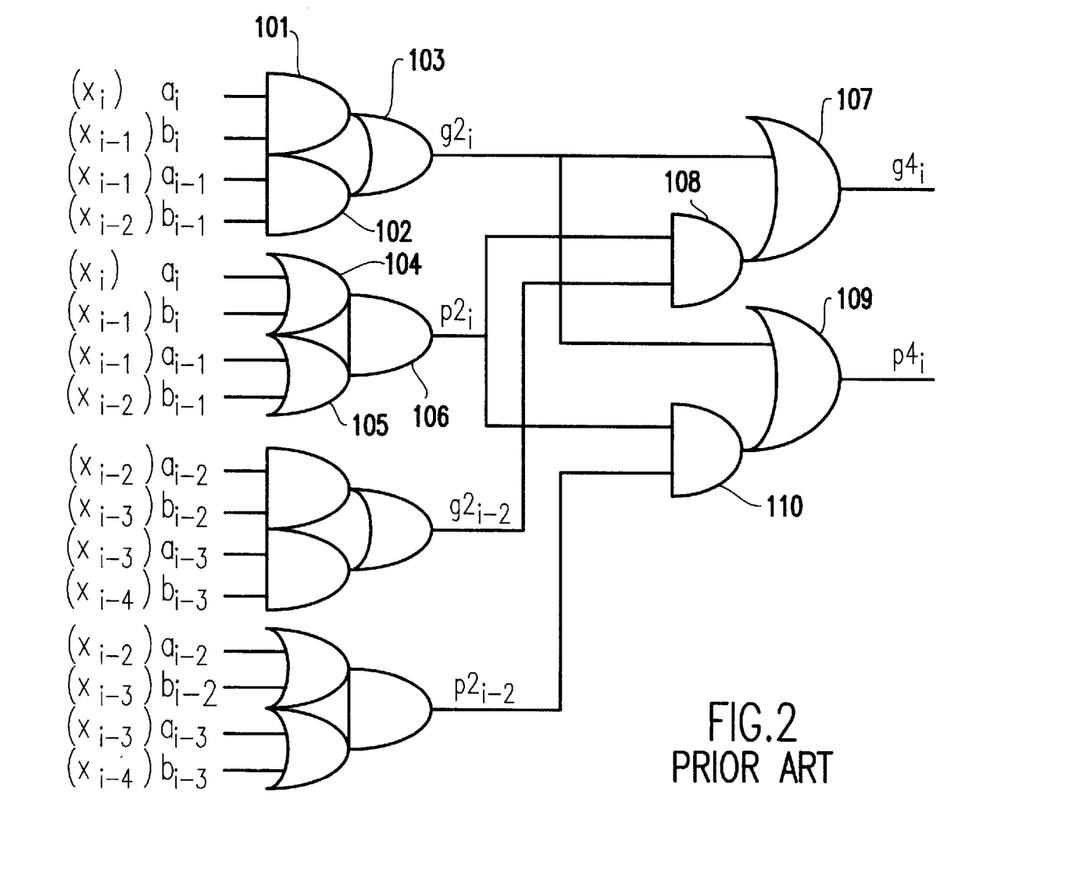
FIG. 2 is a logic diagram of a prior art 4-bit generate/propagate circuit for a X+2X adder.

FIG. 2 represents a prior art generate/propagate circuit design for a X+2X adder. The first level of the carry-look-ahead tree are 2-bit generate/propagate circuits based on following logic equations:

$$g2_i = a_i b_i + a_{i-1} b_{i-1} \quad \text{(EQ 1)}$$

$$p2_i = (a_i + b_i)(a_{i-1} + b_{i-1}) \quad \text{(EQ 2)}$$

Equation 1 is implemented by two AND gates 101 and 102 and an OR gate 103, and equation 2 is implemented by two OR gates 104 and 105 and an AND gate 106. The next pair of significant bits $a_{i-2}, b_{i-2}$ and $a_{i-3}, b_{i-3}$ are operated on by similar logic, and so on. At the second level of the tree, 4-bit generate/propagate signals are produced by merging two adjacent 2-bit generate/propagate signals in a conventional approach, with the logic equations given by:

$$g4_i = g2_i + p2_i g2_{i-2} \quad \text{(EQ 3)}$$

$$p4_i = g2_i + p2_i p2_{i-2} \quad \text{(EQ 4)}$$

Figure 3:
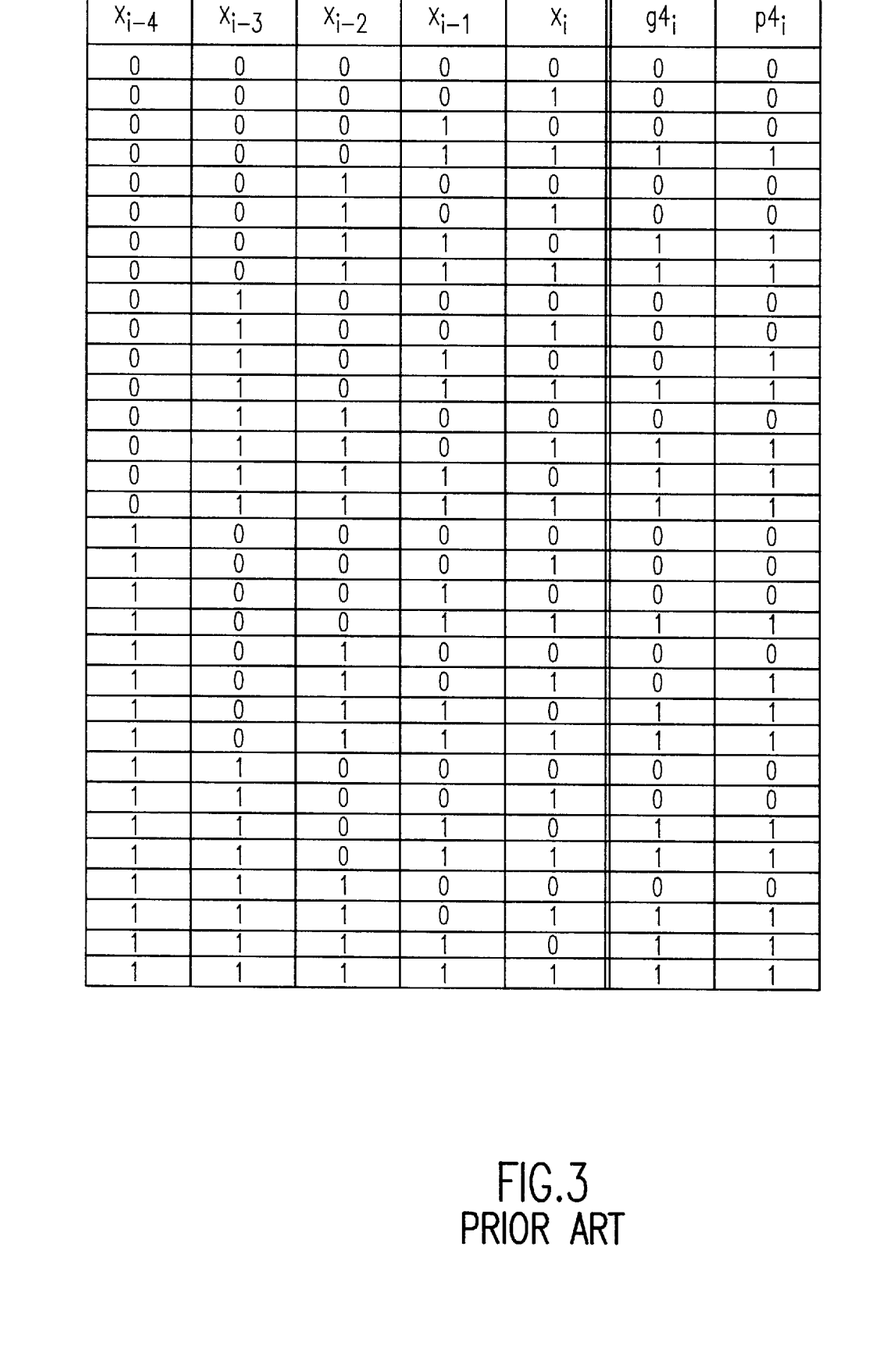
FIG. 3 is a truth table of a prior art 4-bit generate/propagate logic for the X+2X adder shown in FIG. 2.

Equation 3 is implemented by OR gate 107 and AND gate 108, and equation 4 is similarly implemented by OR gate 109 and AND gate 110. FIG. 3 is the truth table for the prior art 4-bit generate/propagate function implemented in the logic of FIG. 2.

SUMMARY OF THE INVENTION

It is therefore an object of the invention to provide a fast X+2X adder wherein the computation speed is improved by restructuring the carry generate/propagate logic.

It is another purpose of the present invention to obtain high performance 3X adder with multi-bit generation/propagation circuit.

According to the invention, full advantage is taken of the fact that in the X+2X computation, the input X is left-shifted by one bit and then added to itself. This idea led to significantly simplified multi-bit carry generate and propagate functions, and therefore fast circuits.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 4A:
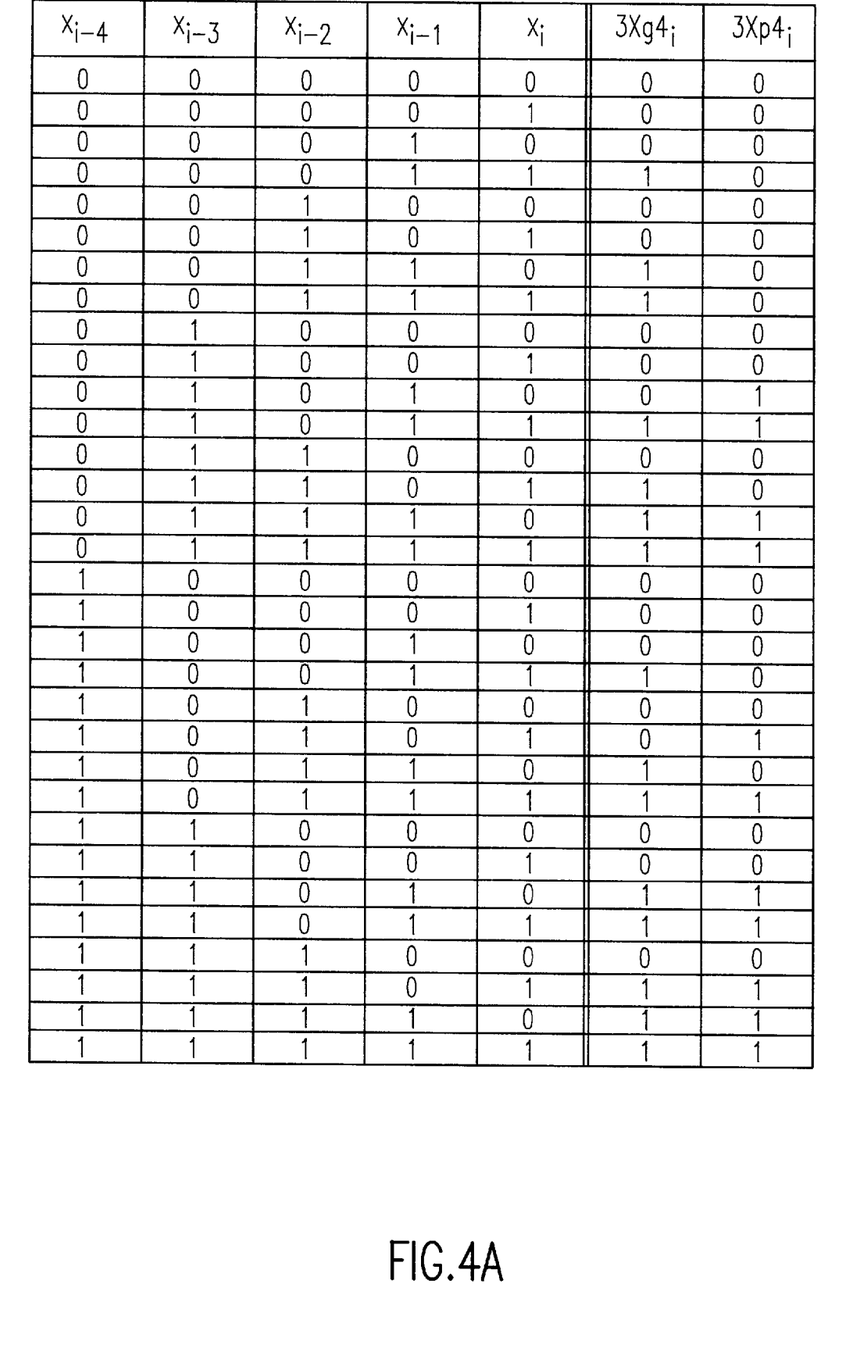
FIG. 4A is a truth table for a 4-bit 3X generate/propagate logic in accordance with present invention.
Figure 4B:
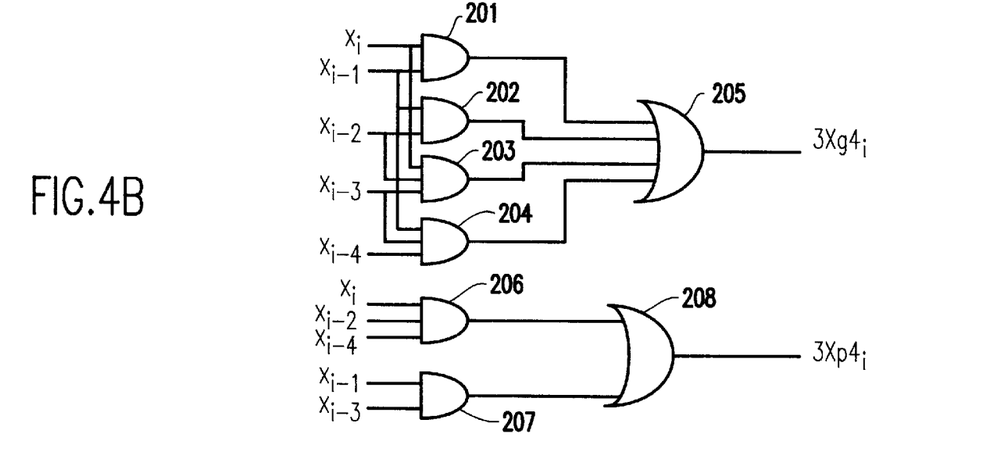
FIG. 4B is a logic diagram of a 4-bit 3X generate/propagate circuit implementing functions of FIG. 4A using AND and OR gates.

The truth table for one form of the 4-bit 3X generate/propagate functions in accordance with present invention is shown in FIG. 4A. FIG. 4B a logic diagram of 4-bit 3X generate/propagate circuits implemented using AND and OR gates. The functions implemented by the circuits are as follows:

$$3Xg4_i = x_i x_{i-1} + x_{i-1} x_{i-2} + x_i x_{i-2} x_{i-3} + x_{i-1} x_{i-3} x_{i-4} \quad (EQ\ 5)$$

$$3Xp4_i = x_i x_{i-2} x_{i-4} + x_{i-1} x_{i-3} \quad (EQ\ 6)$$

Figure 4C:
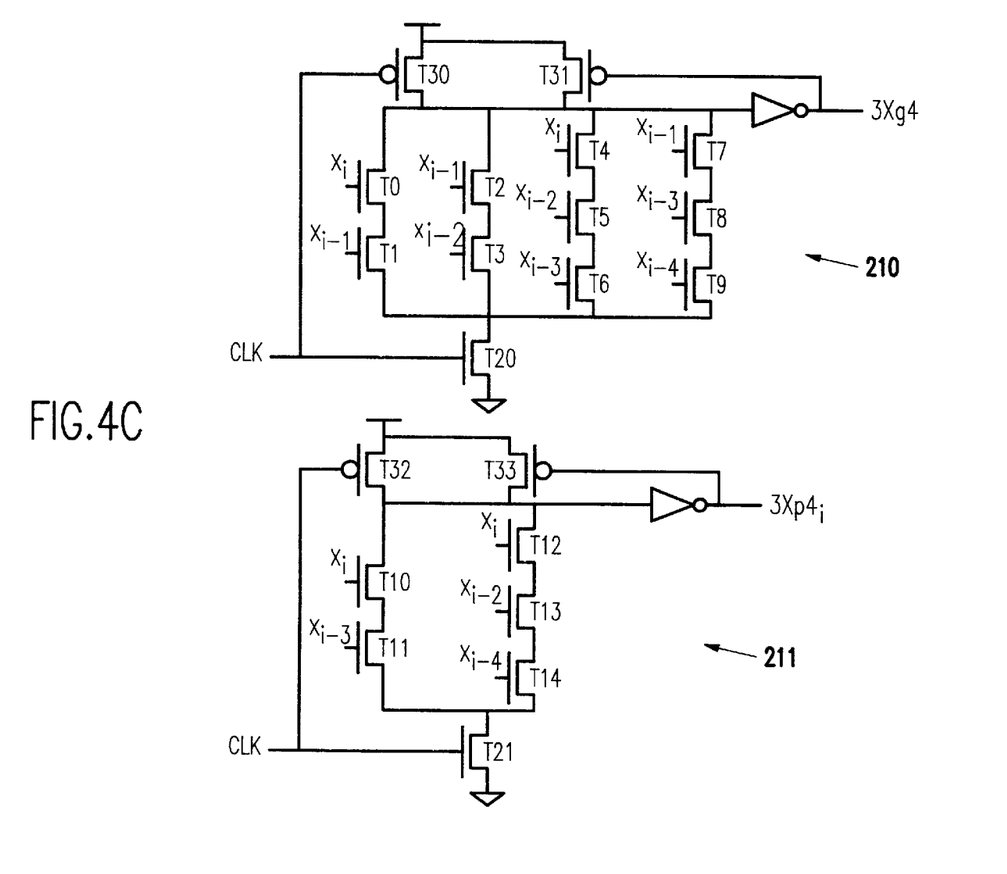
FIG. 4C is a schematic diagram of CMOS domino gates implementing the 4-bit 3X generate/propped logic of FIG. 4A.

Equation 5 is implemented by AND gates 201, 202, 203, and 204 and OR gate 205, and equation 5 is implemented by AND gates 206 and 207 and OR gate 208. It will be observed that, in contrast with the logic implementation of FIG. 2, there is only a two gate delay by the circuit implementation of FIG. 4B. The two logic circuits of FIG. 4B are well suited for implementation using dynamic circuits, such as dominos with pull-down network constructed with N-type MOSFET, and FIG. 4C is a schematic diagram of domino circuits implementing the same functions. More specifically, circuit 210 implements equation 5, and circuit 211 implements equation 6.

Figure 5A:
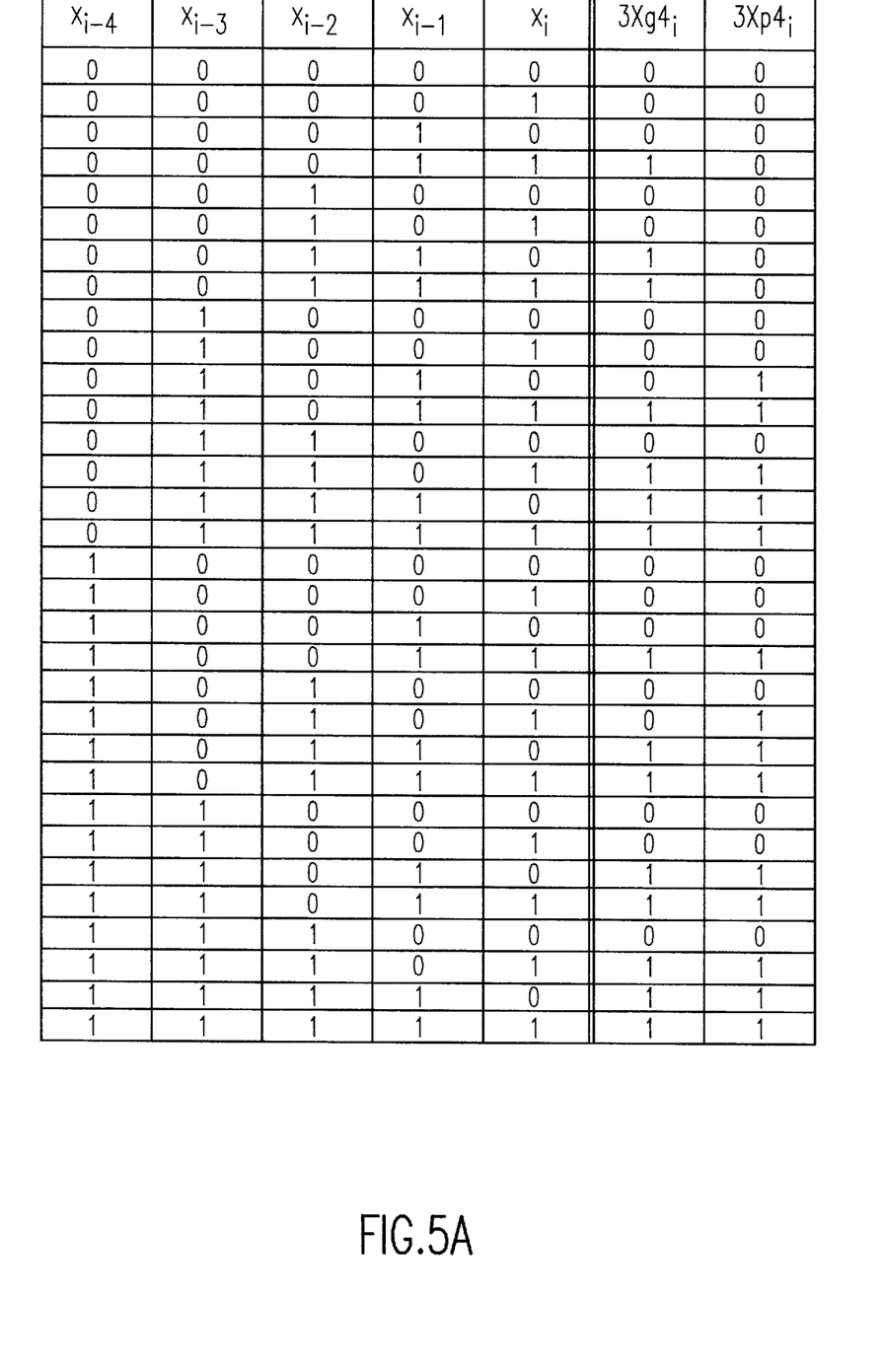
FIG. 5A is a truth table of another form of 4-bit 3X generate/propagate logic according to the invention.
Figure 5B:
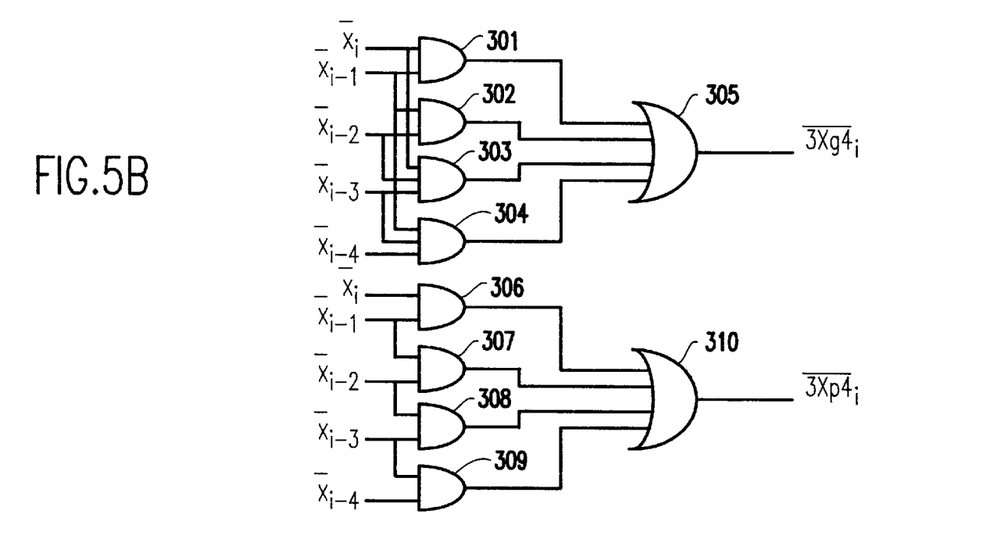
FIG. 5B is a logic diagram of a 4-bit 3X generate/propagate circuits implementing functions of FIG. 5A using AND and OR gates.

FIG. 5A is the truth table for another form of the 4-bit 3X generate/propagate functions in accordance which is better suited for use with inverted input, and FIG. 5B is a schematic diagram of a implementation using simple AND and OR gates. The logic functions implemented are given by:

$$\overline{3Xg4_i} = \overline{x_i}\overline{x_{i-1}} + \overline{x_{i-1}}\overline{x_{i-2}} + \overline{x_{i-1}}\overline{x_{i-3}} + \overline{x_i}\overline{x_{i-2}}\overline{x_{i-4}} \quad (EQ\ 7)$$

$$\overline{3Xp4_i} = \overline{x_i}\overline{x_{i-1}} + \overline{x_{i-1}}\overline{x_{i-2}} + \overline{x_{i-2}}\overline{x_{i-3}} + \overline{x_{i-3}}\overline{x_{i-4}} \quad (EQ\ 8)$$

Figure 5C:
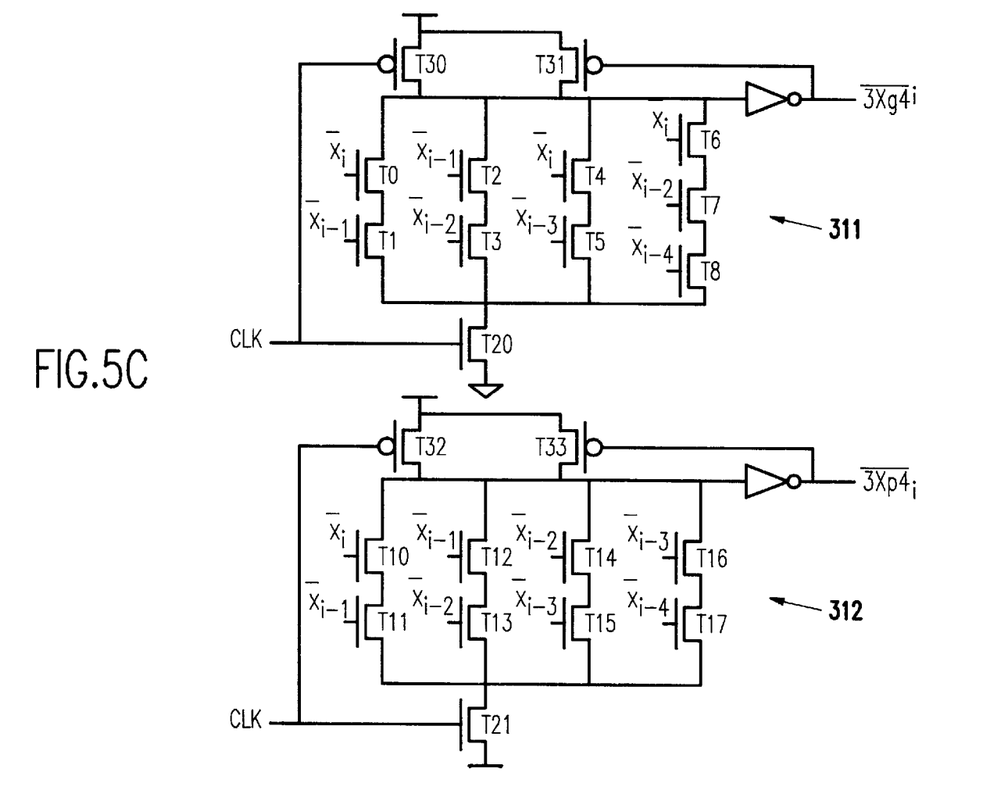
FIG. 5C is a schematic diagram of CMOS domino gates implementing the 4-bit 3X generate/propagate logic of FIG. 5A.

Equation 7 is implemented by AND gates 301, 302, 303, and 304 and OR gate 305, and equation 8 is implemented by AND gates 306, 307, 308, and 309 and OR gate 310. FIG. 5C is a schematic diagram of domino gates implementing these same 4-bit 3X generate/propagate functions. More particularly, circuit 311 implements equation 7, and circuit 312 implements equation 8.

By using these new 4-bit 3X generate/propagate circuits at the first stage of the carry-lookahead tree in a X+2X adder, the height of the tree can be reduced, leading to a faster adder.

Figure 6A:
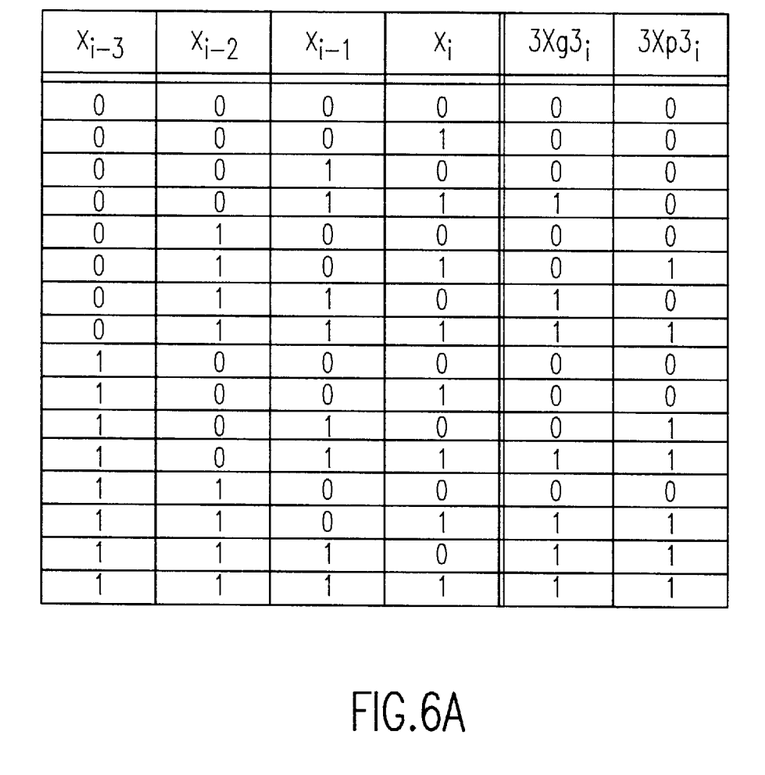
FIG. 6A is a truth table of a 3-bit 3X generate/propagate logic according to the invention.
Figure 6B:
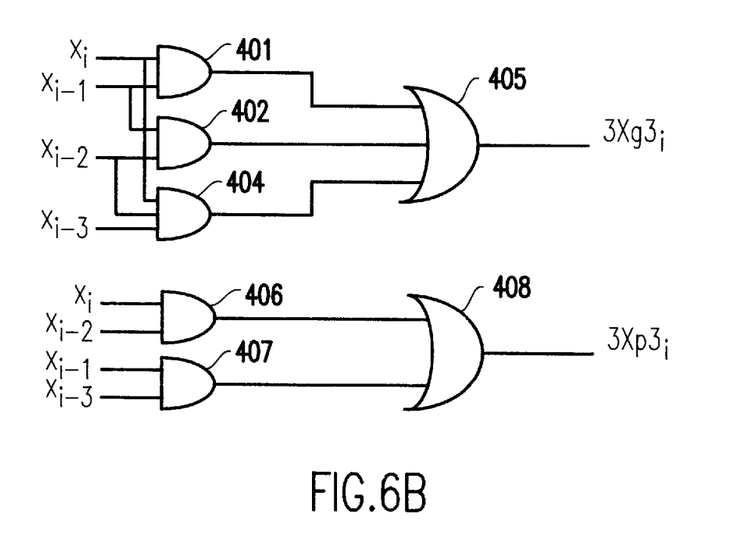
FIG. 6B is a logic diagram of a 3-bit 3X generate/propagate circuit implementing functions of FIG. 6A.

The truth table for a 3-bit 3X generate/propagate function is shown in FIG. 6A, and FIG. 6B is a schematic diagram of a 3-bit 3X generate/propagate circuits with such functions implemented using AND and OR gates. The logic equations for the circuits are:

$$3Xg3_i = x_i x_{i-1} + x_{i-1} x_{i-2} + x_i x_{i-2} x_{i-3} \quad (EQ\ 9)$$

$$3Xp3_i = x_i x_{i-2} + x_{i-1} x_{i-3} \quad (EQ\ 10)$$

Equation 9 is implemented by AND gates 401, 402 and 403 and OR gate 404, and equation 10 is implemented by AND gates 405 and 406 and OR gate 407. Again, this logic can be readily implemented by domino gates similar to FIGS. 4C and 5C.

Figure 7A:
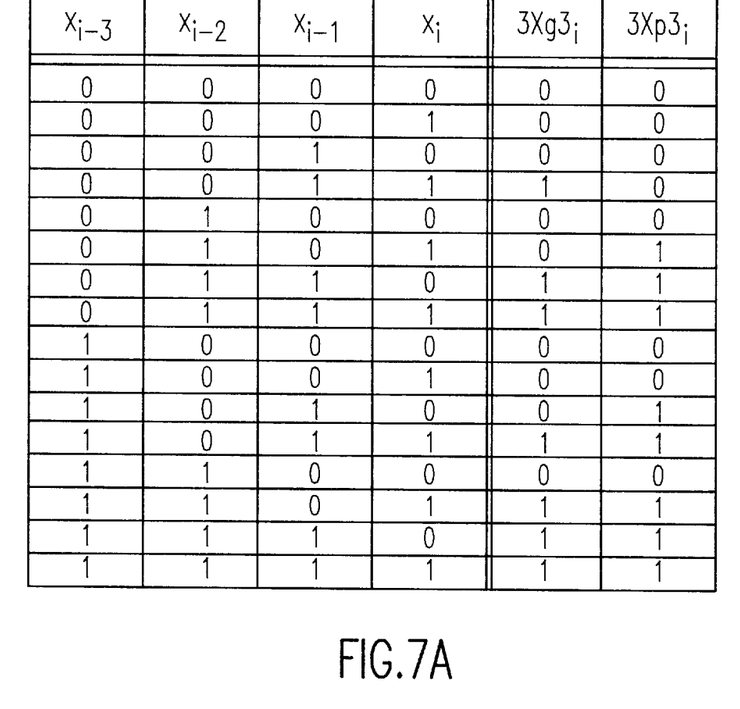
FIG. 7A is a truth table of another form of a 3-bit 3X generate/propagate logic according to the invention.
Figure 7B:
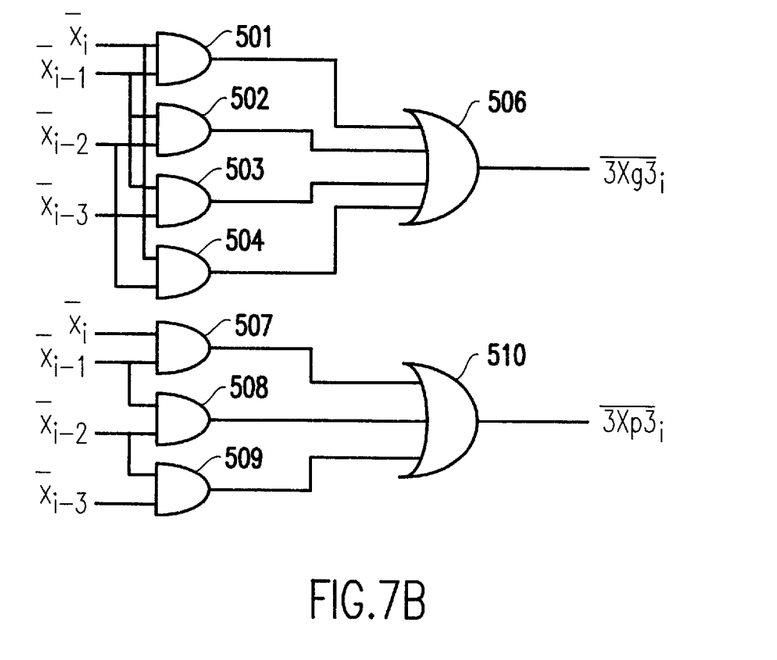
FIG. 7B is a schematic diagram of a 3-bit 3X generate/propagate circuit implementing functions of FIG. 7A.

FIG. 7A is the truth table for another form of 3-bit 3X generate/propagate logic suitable for using with inverted inputs, and FIG. 7B shows an implementation of the logic using AND and OR gates. The logic functions implemented are given by:

$$\overline{2Xg3_i} = \overline{x_i}\overline{x_{i-1}} + \overline{x_{i-1}}\overline{x_{i-2}} + \overline{x_i}\overline{x_{i-2}} + \overline{x_{i-1}}\overline{x_{i-3}} \quad (EQ\ 11)$$

$$\overline{3Xp3_i} = \overline{x_i}\overline{x_{i-1}} + \overline{x_{i-1}}\overline{x_{i-2}} + \overline{x_{i-2}}\overline{x_{i-3}} \quad (EQ\ 12)$$

Equation 11 is implemented with AND gates 501, 502, 503, and 504 and OR gate 505, and equation 12 is implemented with AND gates 506, 507 and 508 and OR gate 509. This logic can also be readily implemented by domino gates similar to FIGS. 4C and 5C.

Figure 8A:
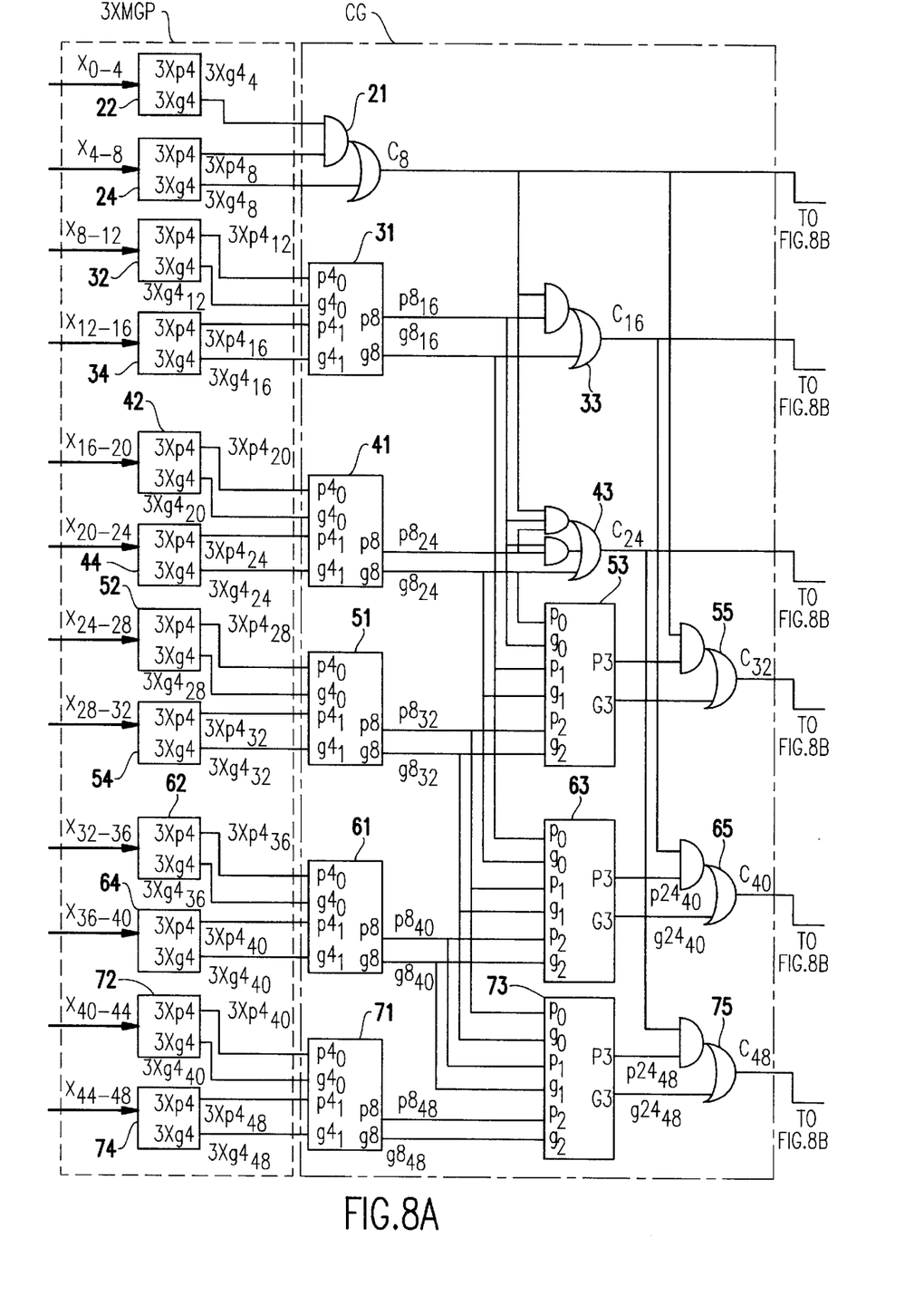
FIG. 8 is a block and logic diagram of a X+2X adder in accordance with present invention.
Figure 8B:
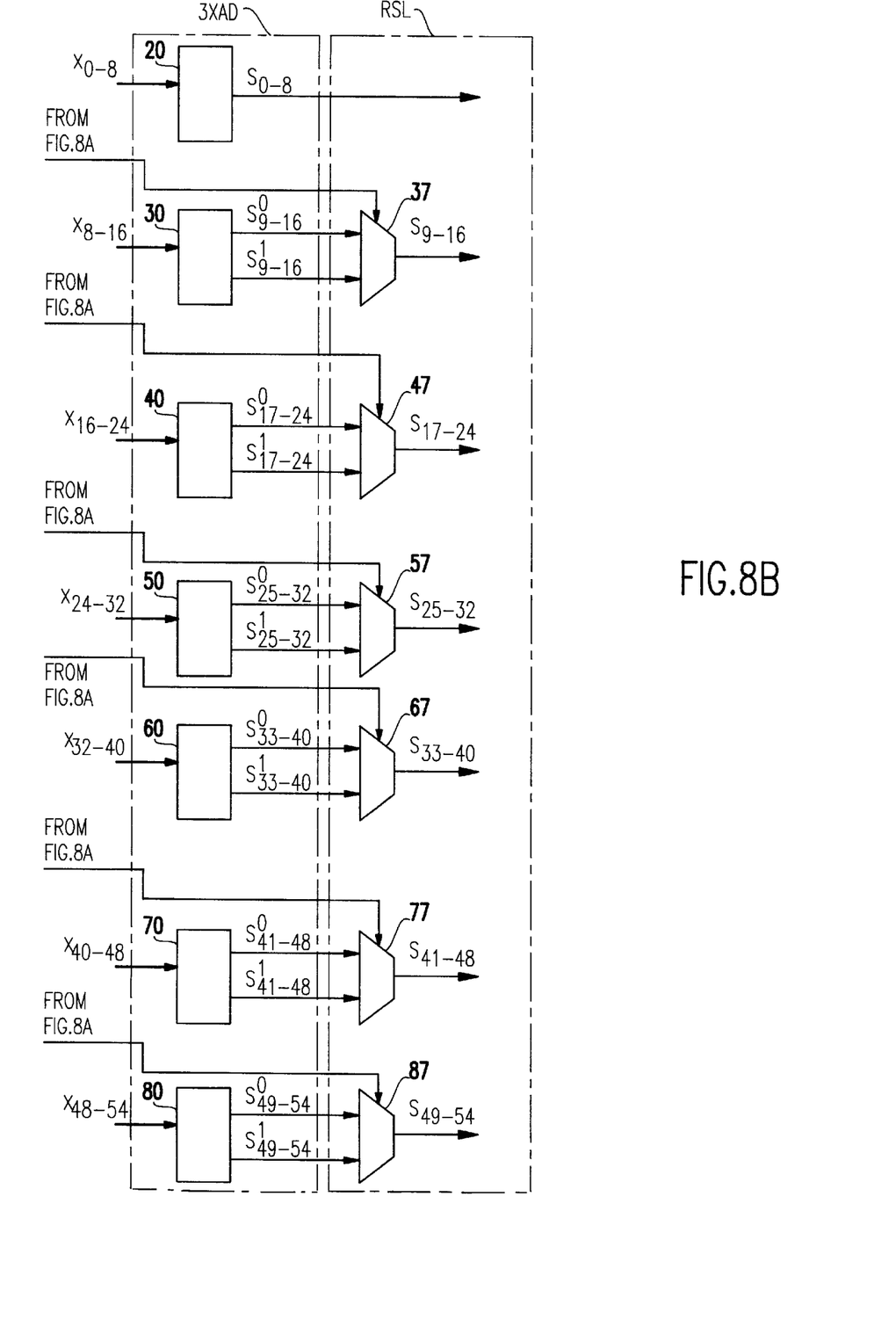

FIG. 8 is a block and logic diagram of a X+2X adder in accordance with present invention. The circuit of FIG. 8 is for an embodiment wherein multiplicand $X(x_{52}, x_{51}, \ldots x_0)$ is multiplied by 3 to make product $S(S_{54}, S_{53}, \ldots S_O)$. The 3X computation circuit comprises of a 3X multi-bit generate/propagate sub-circuit (3XMGP), a carry generate sub-circuit(CG), 3X block adders (3XAD), and a result selection sub-circuit(RSL).

The 3X multi-bit generate/propagate circuit (3XMGP) is implemented as a logic macro consisting of a set of 4-bit 3X generate/propagate sub-blocks. The first block 22 takes $x_{0-4}$ as inputs and produces $3Xg4_4$ as output, and the other sub-blocks of the set 24, 32, 34, 42, 44, 52, 54, 62, 64, 72, and 74 each takes five consecutive bits of the multi-bit binary number X and produces a pair of 4-bit 3X generate and propagate signals $3Xg4_8$ and $3Xp4_8$, $3Xg4_{12}$ and $3Xp4_{12}$, . . . , $3Xg4_{48}$ and $3Xp4_{48}$. Every two adjacent 4-bit 3X generate/propagate sub-blocks share one bit input. For example, sub-blocks 32 and 34 share input bit $x_{12}$, and sub-blocks 34 and 42 share bit $x_{16}$.

The carry generate circuit(CG) takes the 4-bit 3X generate/propagate signals from the 3X multi-bit generate/propagate circuit (3XMGP) as inputs and produces six carry signals $c_8$, $c_{16}$, $c_{24}$, $c_{32}$, $c_{40}$, and $c_{48}$ in a standard approach.

Figure 9:
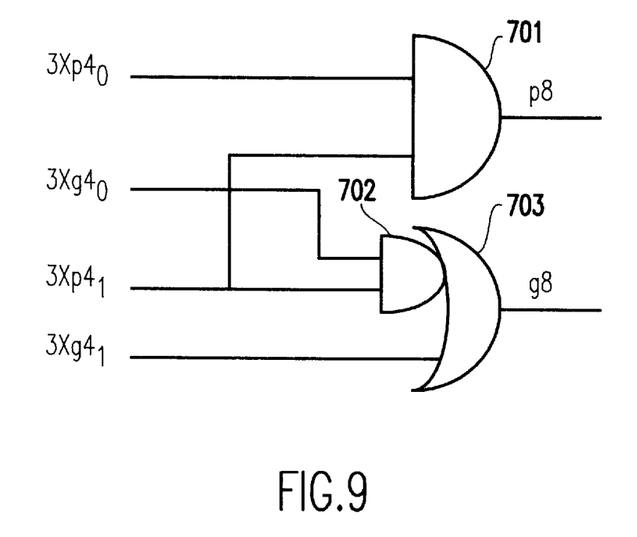
FIG. 9 is a detailed logic diagram of merge-2 circuits 31, 41, 51, 61, and 71 of FIG. 8.

FIG. 9 is a detailed logic diagram of merge-2 circuits 31, 41, 51, 61, and 71 of FIG. 8. AND gate 701 implements the equation $p8 = 3Xp4_0 3Xp4_1$, and AND gate 702 and OR gate 703 implements the equation $g8 = 3Xg4_0 3Xp4_1 + 3Xg4_1$.

Figure 10:
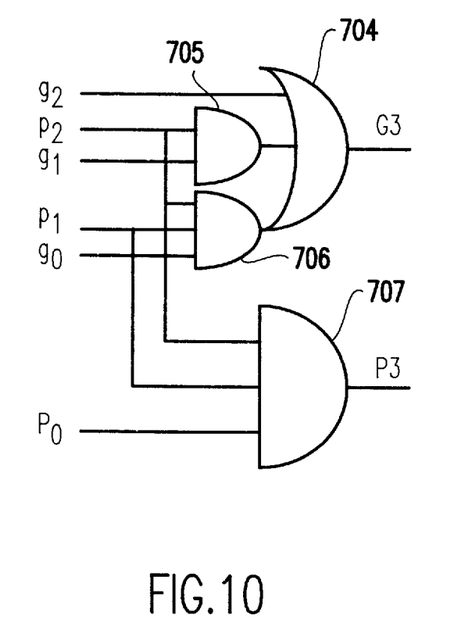
FIG. 10 is a detailed logic diagram of merge-3 circuits 53, 63, and 73 of FIG. 8.

FIG. 10 is a detailed logic diagram of merge-3 circuits 53, 63, and 73 of FIG. 8. OR gate 704 and AND gates 705 and 706 implement equation $G3 = g_2 + P_2 g_1 + P_2 P_1 g_0$, and AND gate 707 implements the equation $P3 = P_0 P_1 P_2$.

Returning to FIG. 8, the 3X block adder (3XAD) is implemented as a logic macro consisting of a set of 3X block adders of which, the first block adder 20 takes $x_{0-8}$ as input and generates the first nine bits of product $S_{0-8}$, the second through sixth 3X block adders (30, 40, 50, 60, and 70) each operating on nine consecutive bits of the input binary number $X(x_{8-16}, x_{16-24}, x_{24-32}, x_{32-40}, \text{and } x_{40-48})$ and produces two 8-bit conditional 3X products ($S^0_{9-16}$ and $S^1_{9-16}$, $S^0_{17-24}$ and $S^1_{17-24}$, $S^0_{25-32}$ and $S^1_{25-32}$, $S^0_{33-40}$ and $S^1_{33-40}$, and $S^0_{41-48}$ and $S^1_{41-48}$), the first of which is the result under the premise that there is no carry in from a lower order adder, and the second is the result under the premise that there is a carry-in from a lower order block adder, the last block adder 80 takes bit $x_{48-52}$ as input and produces $S^0_{49-54}$ and $S^1_{49-54}$.

Figure 11:
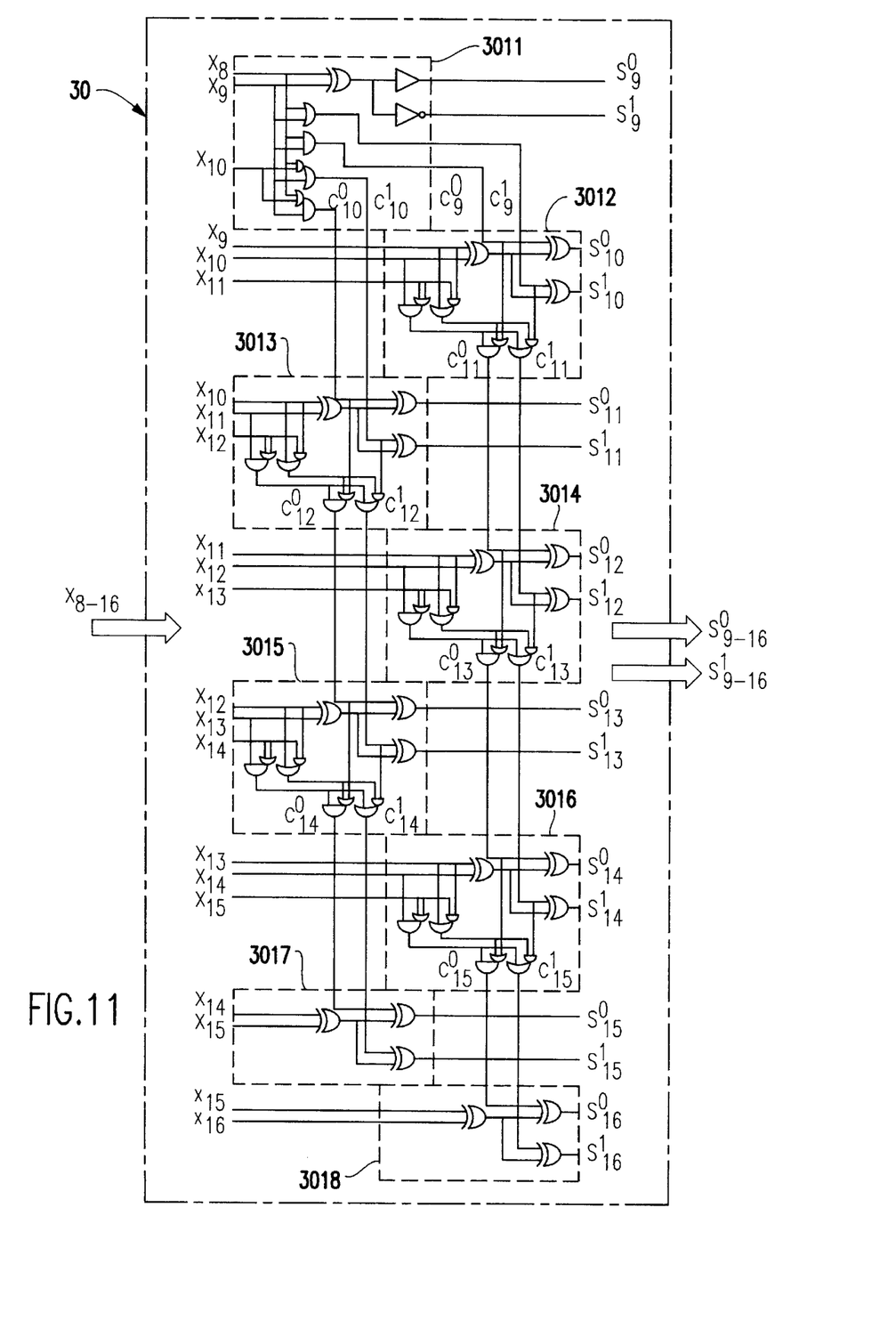
FIG. 11 is a detailed logic diagram of the second 3X block adder 30 of FIG. 8.

FIG. 11 is a detailed logic diagram of the second 3X block adder 30 of FIG. 8. The 3X block adders 40, 50, 60, and 70 are similar. In FIG. 11, the first bit-adder 3011 output $S^0_9$ is generated by the exclusive OR of inputs $x_8$ and $x_9$; i.e., $x_8 \overline{x_9} + \overline{x_8} x_9$. The second output $S^1_9$ is the inversion of the first; i.e., $x_8 x_9 + \overline{x_8}\overline{x_9}$. The corresponding conditional carries $c^0_9$ and $c^1_9$ are respectively generated by the AND on OR of $x_8$ and $x_9$. These carries are input to bit-adder 3012. The logic of bit-adder 3011 further generates lookahead conditional carries $c^0_{10}$ and $c^1_{10}$ which are respectively generated by the logic functions $x_9(x_8 + x_{10})$ and $x_8 x_{10} + x_9$. The lookahead carries $c^0_{10}$ and $c^1_{10}$ skip the next succeeding bit-adder 3012 and go to the following bit-adder 3013. Thereafter, the bit-adders generate lookahead carries to alternating bit-adders; e.g., the lookahead carries generated by bit-adder 3012 go to bit-adder 3014, the lookahead carries generated by bit-adder 3013 go to bit-adder 3015, and so forth. This alternating pattern is repeated through the 3X block adder. A similar analysis can be made for each of the other bit-adders 3012 to 3018 of 3X block adder 30.

Figure 11A:
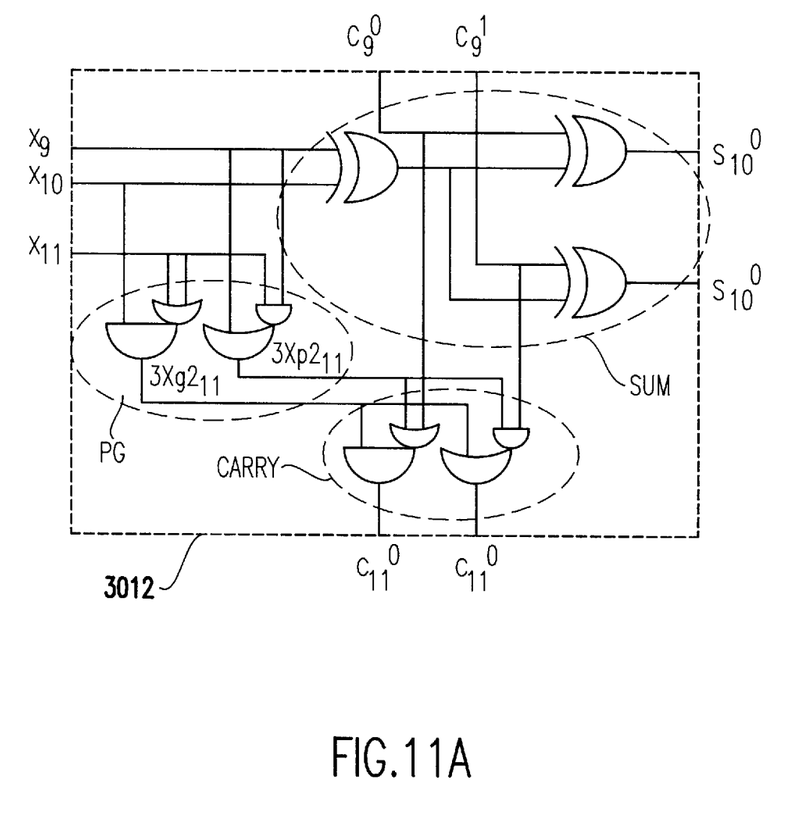
FIG. 11A is a detailed logic diagram of the second bit-adder 3012 of FIG. 11.

FIG. 11A is a detailed logic diagram of the bit-adder 3012 of FIG. 11. It comprises three components: PG, CARRY, and SUM. Component PG takes $x_8$, $x_9$ and $x_{10}$ as inputs and generates 2-bit 3X generate/propagate signals $3X_g2_{11}$ (=$x_{10}$ ($x_9+x_{11}$)) and $3X_p2_{11}$(=$x_{10}+x_9x_{11}$). In general, the 2-bit 3X generate/propagate functions are given by $$3X_g2_i = x_{i-1}(x_{i-2}+x_i)$$

$$3X_p2_i = x_{i-1}+x_{i-2}x_i$$

The CARRY component produces two conditional carries $c^0_{11}$ and $c^1_{11}$ in response to the 2-bit 3X generate/propagate signals and two carries $c^0_9$ and $c^1_9$ from a lower order bit-adder. The use of 2-bit 3X generate/propagate signal for carry propagation significantly reduces the length of the carry chain. The SUM component produces two conditional sum outputs $s^0_{10}$ (from $x_9$, $x_{10}$, and $c^0_9$) and $S^1_{10}$ (from $x_9$, $x_{10}$ and $c^1_9$). A similar analysis can be made for each of the other bit-adders 3013 to 3018 of 3X block adder 30. Because of the alternating pattern of lookahead carry generation, it will be noted that the last two bit-adders 3017 and 3018 generate only conditional sum outputs, and therefor, these two bit-adders only have the SUM components.

Figure 12:
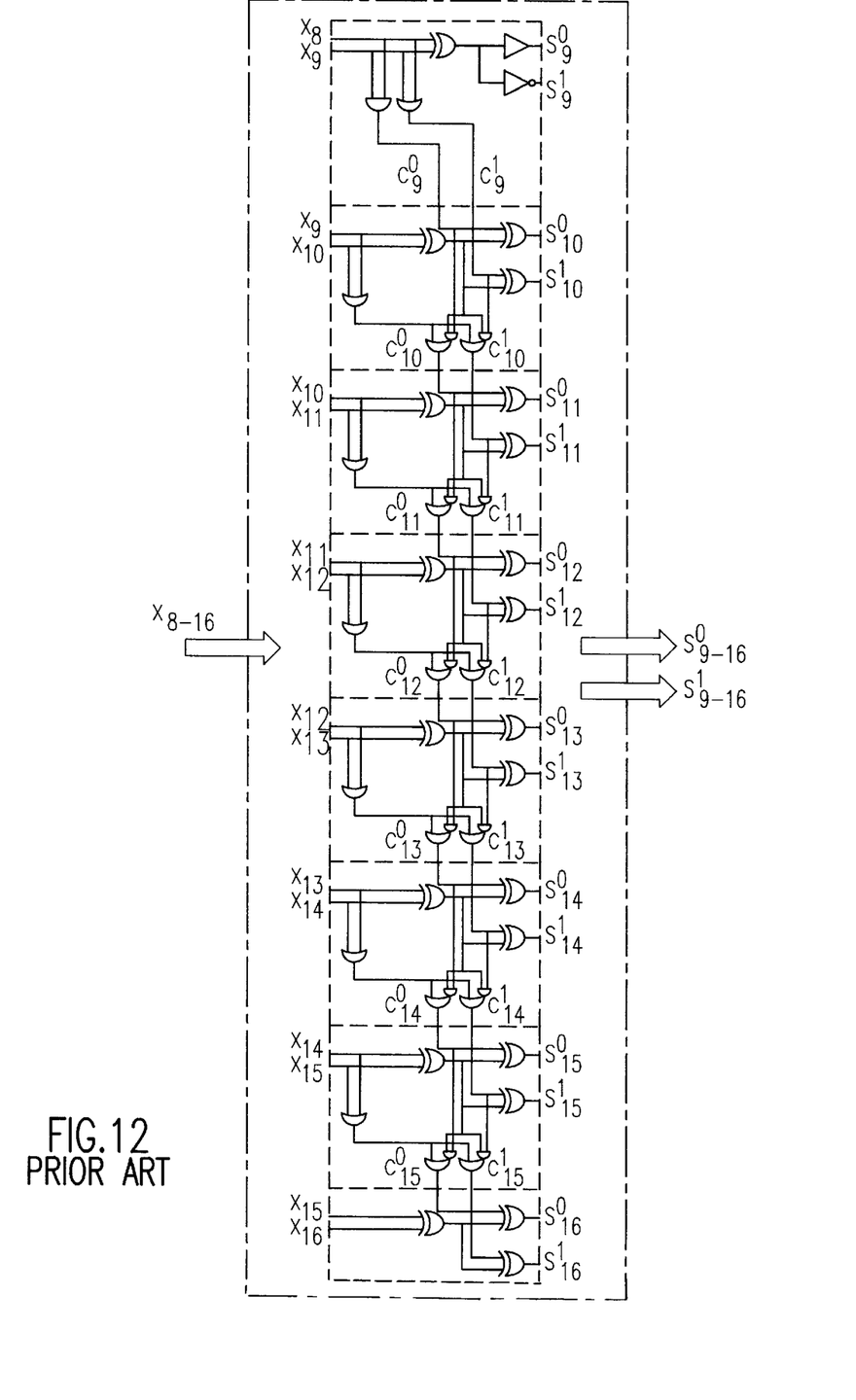
FIG. 12 is a detailed logic diagram of a 3X block adder using the prior art.

FIG. 12 is a detailed logic diagram of a 3X block adder using prior art. An example of this type of block adder is shown in U.S. Pat. No. 4,682,303 to Uya. It will be noted that the block adder of the prior art does not incorporate the alternating pattern of lookahead carries of the block adder shown in FIG. 11. The block adder according to the preferred embodiment of the invention as shown in FIG. 11 is significantly faster than that of the prior art.

Figure 13:
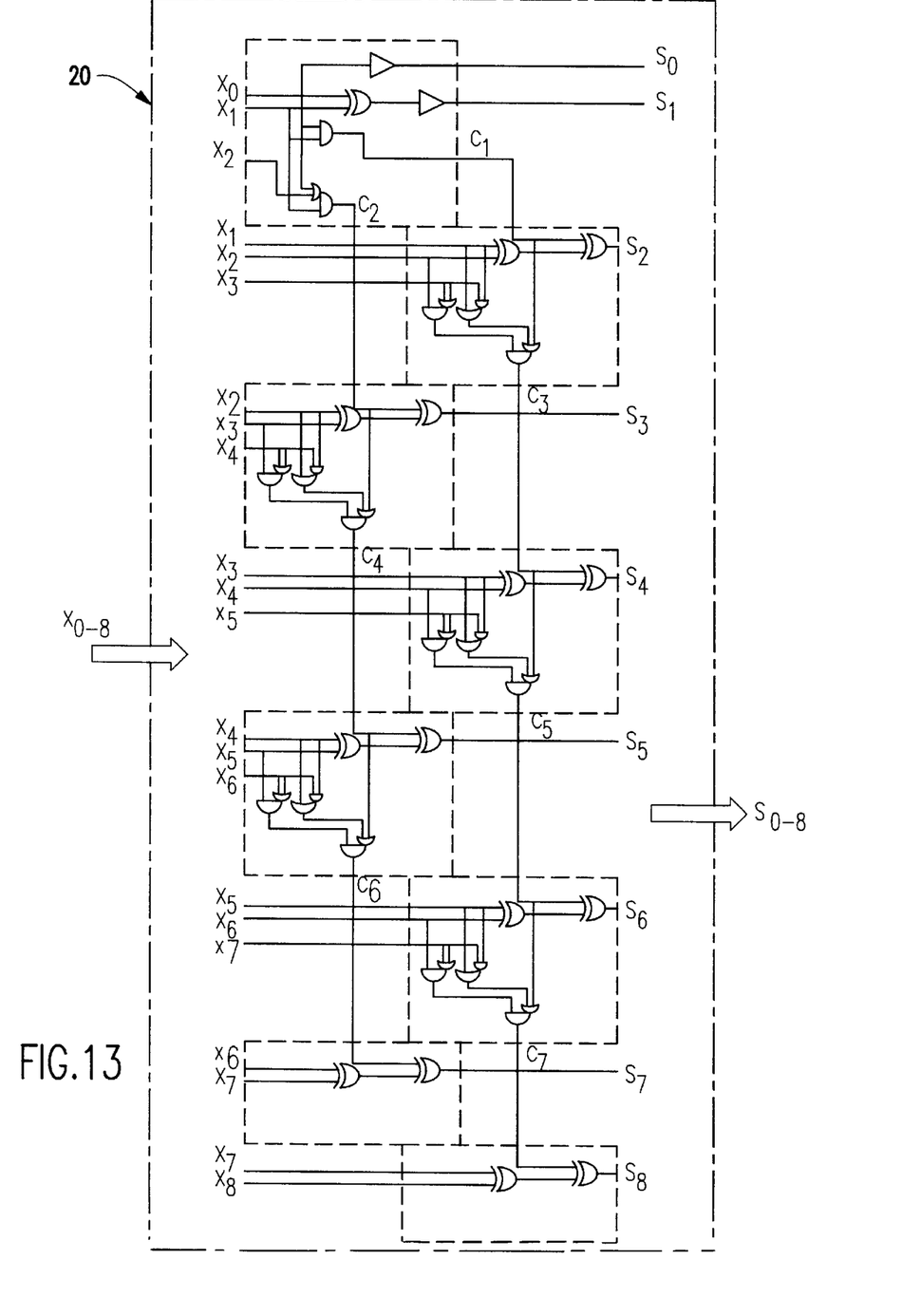
FIG. 13 is a detailed logic diagram of the first 3X block adder 20 of FIG. 8.
Figure 14:
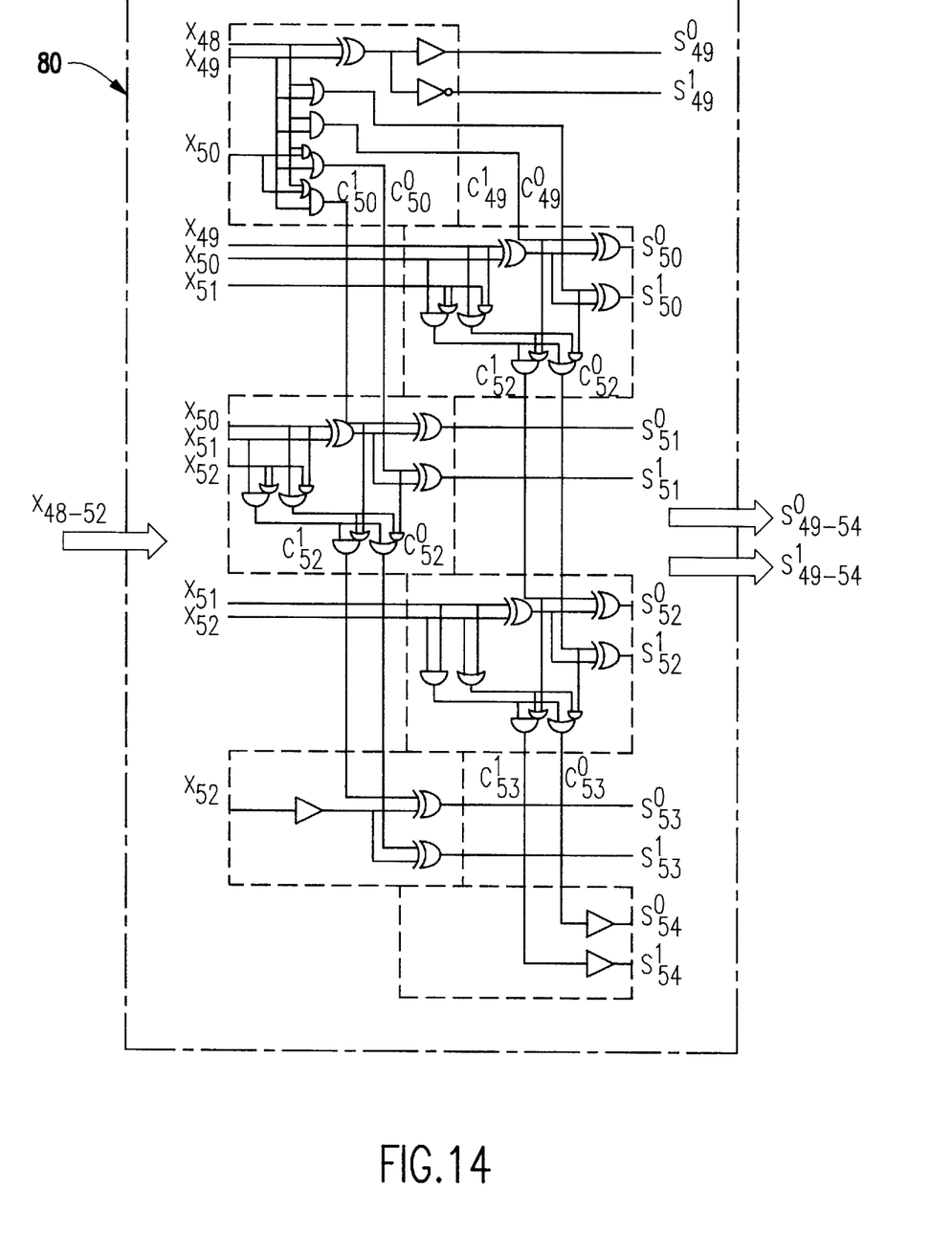
FIG. 14 is a detailed logic diagram of the last 3X block adder 80 of FIG. 8.

To complete the description of FIG. 8, FIG. 13 is a detailed logic diagram of the first 3X block adder 20 of FIG. 8, and FIG. 14 is a detailed logic diagram of the last 3X block adder 80 of FIG. 8.

Referring again to FIG. 8, the RSL sub-circuit consists of a set of 2-input selectors (37, 47, 57, 67, 77, and 87) each corresponding to a block adder in the 3XAD sub-circuit and each selector uses a carry signal produced by the CG sub-circuit to select one of the two conditional 3X products as the final 3X results. For example, $C_8$ is used to select $S^0_{9-16}$ or $S^1_{9-16}$ to produce $S_{9-16}$, and $C_{48}$ is used to select $S^0_{49-54}$ or $S^1_{49-54}$ to produce $S_{49-54}$.

While the invention has been described in terms of a several preferred embodiments, those skilled in the art will recognize that the invention can be practiced with modification within the spirit and scope of the appended claims.

Having thus described our invention, what we claim as new and desire to secure by letters patent is as follows:

1. A 2X+X adder in which a multiplicand is multiplied by three to produce a product output, said 2X+X adder comprising:
   a) a 3X multi-bit generate/propagate sub-circuit receiving said multiplicand and generating 3X generate/propagate signals;
   b) a carry generate sub-circuit responsive to the 3X generate/propagate signals and generating carry signals;
   c) a 3X block adders circuit responsive the multiplicand and generating conditional 3X product signals; and
   d) a result selection circuit responsive to the carry signals for selecting conditional 3X product signals to produce the product output.

2. A 2X+X adder as recited in claim 1, wherein the 3X multi-bit generate/propagate sub-circuit is implemented as a logic macro consisting of a set of multi-bit 3X generate/propagate sub-circuits, a lowest ordered sub-circuit of the set producing a multi-bit generate signal, and each other of the sub-circuits of the set producing a pair of multi-bit 3X generate and propagate signals, and every two adjacent 3X generate/propagate sub-circuits sharing one bit input.

3. A 2X+X adder as recited in claim 2, wherein the 3X generate/propagate sub-circuits implement the following 4-bit 3X generate/propagate logic functions:

$$3X_g4_i = x_ix_{i-1}+x_{i-1}x_{i-2}+x_ix_{i-2}x_{i-3}+x_{i-1}x_{i-3}x_{i-4}, \quad 3X_p4_i = x_ix_{i-2}x_{i-4}+x_{i-1}x_{i-3}.$$

4. A 2X+X adder as recited in claim 2, wherein the 3X generate/propagate sub-circuits implement the following 4-bit 3X generate/propagate logic functions:

$$\overline{3Xg4_i} = \overline{x_i}\overline{x_{i-1}}+\overline{x_{i-1}}\overline{x_{i-2}}+\overline{x_{i-1}}\overline{x_{i-3}}+\overline{x_i}\overline{x_{i-2}}\overline{x_{i-4}},$$

$$\overline{3Xp4_i} = \overline{x_i}\overline{x_{i-1}}+\overline{x_{i-1}}\overline{x_{i-2}}+\overline{x_{i-2}}\overline{x_{i-3}}+\overline{x_{i-3}}\overline{x_{i-4}}.$$

5. A 2X+X adder as recited in claim 2, wherein the 3X generate/propagate sub-circuits implement the following 3-bit 3X generate/propagate logic functions:

$$3Xg3_i = x_ix_{i-1}+x_{i-1}x_{i-2}+x_ix_{i-2}x_{i-3}, \quad 3Xp3_i = x_ix_{i-2}+x_{i-1}x_{i-3}.$$

6. A 2X+X adder as recited in claim 2, wherein the 3X generate/propagate sub-circuits implement the following 3-bit 3X generate/propagate logic functions:

$$\overline{3Xg3_i} = \overline{x_i}\overline{x_{i-1}}+\overline{x_{i-1}}\overline{x_{i-2}}+\overline{x_i}\overline{x_{i-2}}+\overline{x_{i-1}}\overline{x_{i-3}},$$

$$\overline{3Xp3_i} = \overline{x_i}\overline{x_{i-1}}+\overline{x_{i-1}}\overline{x_{i-2}}+\overline{x_{i-2}}\overline{x_{i-3}}.$$

7. A 2X+X adder as recited in claim 2, wherein the 3X block adders circuit is implemented as a logic macro consisting of a set of 3X block adder sub-circuits, a lowest ordered sub-circuit of the set producing directly a lowest ordered portion of the product output, and each other of the sub-circuits of the set producing conditional product signals, each of the sub-circuits being composed of bit-adders which use the following 2-bit 3X generate/propagate logic functions:

$$3X_g2_i = x_{i-1}(x_{i-2}+x_i)$$

$$3X_p2_i = x_{i-1}+x_{i-2}x_i$$

to generate lookahead carries for alternating ones of succeeding bit-adders of the sub-circuit.

* * * * *